Figure 1:
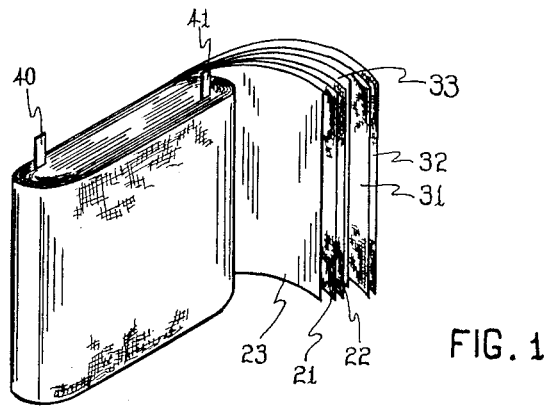

Sept 10, 1957      P. ROBINSON      2,806,190

LOW POWER FACTOR CAPACITOR

Filed Nov. 6, 1952

INVENTOR.
PRESTON ROBINSON
BY
Connolly and Hutz
HIS ATTORNEYS

United States Patent Office 2,806,190
Patented Sept. 10, 1957

2,806,190
LOW POWER FACTOR CAPACITOR

Preston Robinson, Williamstown, Mass., assignor to Sprague Electric Company, North Adams, Mass., a corporation of Massachusetts Application November 6, 1952, Serial No. 319,072

3 Claims. (Cl. 317—258)

The present invention relates to electrical capacitors, more particularly to capacitors having dielectrics made from paper.

Paper is one of the most convenient materials to use for capacitor dielectrics, largely because it is quite inexpensive, withstands relatively high electrical stresses, is available in many thicknesses, is pliable and can be used to make the so-called wound type of capacitors which are readily manufactured. Unfortunately, however, the paper dielectrics heretofore used are not too efficient and absorb a relatively high proportion of electrical energy that is passed through them. This lack of efficiency is represented by a power factor scale which indicates the percentage of the supplied power which is not transmitted by a capacitor having the particular dielectric.

Electrical energy absorbed in a capacitor is transformed into heat and dissipation of this heat becomes progressively more difficult as the size of the capacitor increases, by reason of the decrease in surface area relative to the amount of heat generated. The power factor of the dielectric is a measure of energy loss, a low power factor characterizing low energy loss and hence little heating. As the temperature of the capacitor increases it may increase the power factor which further increases the generation of heat, with this cycle continuing until the temperature reaches a point where the capacitor is destroyed. It is desired in the capacitor field to physically increase the size of the individual capacitors so as to obtain greater capacitance and to operate them at higher ambient temperatures such as exist in the crowded chassis of a television or radio receiver where adjacent hot components such as vacuum tubes and power supply transformers effect considerable heating. One approach is to use condenser dielectrics of lower power factor, thereby allowing an increase in physical size by reducing the amount of heat which must be dissipated per unit volume, and this is and has been the constant aim of research in the capacitor field. An improvement of even a small fraction of one percent, particularly at operating temperatures, is very important.

Among the objects of the present invention is the provision of paper capacitor dielectrics having a power factor lower than heretofore obtainable.

Further objects of the invention include a method for preparing the above dielectrics and capacitors incorporating these dielectrics.

Figure 2:
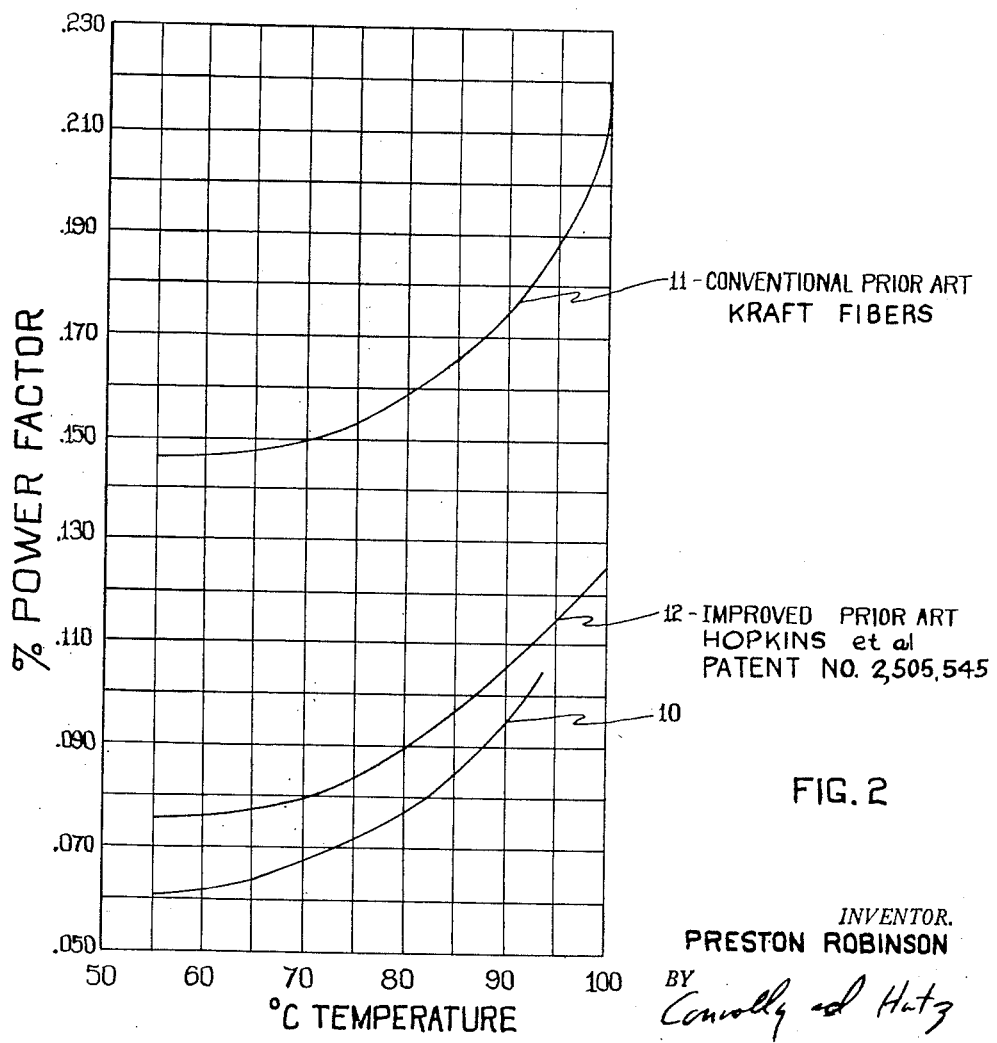

The above as well as additional objects of the present invention will be more readily understood from the following description of several of its embodiments, reference being made to the accompanying drawings wherein:

Figure 1 is a perspective view of a wound type capacitor embodying the invention, the capacitor being partially unwound to more clearly illustrate its structure. Figure 2 shows, in graph form, variations in percent power factor with changes in temperature for the products of the invention and those of the prior art.

It has been discovered that the power factor of a paper dielectric is considerably diminished if the paper fibers are reacted with an organic polyisocyanate. The reaction can be effected before, during, or after the fibers are subjected to the paper-forming operations. According to one modification a suspension of kraft paper fibers is heated in a water-displacing solvent inert to organic isocyanates to drive off water from the fibers, the anhydrous fibers are then heated for at least about two hours at a temperature of at least about 70° C. in a solution of an organic polyisocyanate in a diluent, and the resulting fibers are then sheeted into a paper.

The following example gives a typical procedure for carrying out the above reaction:

To 40 grams of southern kraft pulp made from southern pine and from which most of the water has been extracted as by squeezing, there is added an excess (200 cc.) of benzene, after which the mixture is heated to boiling and boiled until no more water is evolved, as indicated by the absence of cloudiness when the vapors are condensed. A solution of 5 grams 1-tolylene-2,4-diisocyanate, dissolved in 495 grams of trichloroethane is then added to the resulting pulp slurry, and the mixture heated for 3.25 hours at 83° C. under atmospheric pressure. The mixture is then permitted to cool after which the excess liquid is poured off. The resulting pulp slurry is washed with methanol to remove the trichloroethane, which is insoluble in water, and then washed with water until the salt content is below about .5%. This washing with water is very slight unless the initial pulp had not previously been properly washed. The completed pulp is then subjected to the beating and sheeting-out operation described in Hopkins et al. Patent No. 2,505,545, dated April 25, 1950, to make a super-calendered sheet 0.00035 inch thick.

The power factor of the above prepared sheet at about 60° C. is approximately 0.062, while that of the best prior art, the above-identified Hopkins et al. patent, at 60° C. is 0.077. The power factor of prior art condenser paper made of kraft fibers not treated with a polyisocyanate in accordance with the invention at this temperature is approximately 0.147. All the above measurements were made at 60 cycles. It will be noted that at temperatures of about 60° C. the power factor of the paper of the present invention is about 20% less than the best prior art paper, and fully 60% less than that ordinarily used. At higher temperatures the power factor of the polyisocyanate reacted paper increases somewhat but at 90° C. is still about 10% lower than the best prior art paper. In the past, capacitors with paper dielectrics have normally been limited to use at temperatures no higher than about 85° C.

As indicated by the curves of Figure 2 the paper dielectric of the present invention operates at appreciably higher efficiency than that obtainable from prior art techniques, and capacitors made with this dielectric can be built to operate at higher ambient temperatures and can have appreciably greater size.

Figure 1 shows a typical capacitor according to the present invention. This capacitor is made by convolutely winding a pair of metal foils 23, 33 with sets of dielectric sheets 21, 22, 31, 32. Each set of dielectric sheets includes a pair of individual polyisocyanate treated papers made as described above. This is in accordance with the well-known practice that guards against the shorting out of the condenser by reason of imperfections normally found in the individual sheets. The likelihood of the alignment of the imperfections on the different sheets of one set, is quite remote. The capacitor is provided with terminal connectors indicated as tabs 40, 41 which are connected to the separate foils as by being suitably fixed to them, or by being frictionally held between turns that are tightly wound. After the capacitor is completely wound, it may be impregnated in any suitable manner to increase its breakdown voltage and/or capacitance. This impregnation is well-known and described for example in the Robinson et al. Patent No. 2,526,688, granted October 24, 1950. Suitable housings or cases can be provided for the impregnated or unimpregnated condenser, as also described in this patent.

Figure 2 illustrates graphically the improvement effected by the present invention. Curve 11 illustrates results obtained using a conventional prior art kraft paper dielectric; curve 12 represents results obtained using the product of the above mentioned Hopkins U. S. Patent 2,505,545; and curve 10 demonstrates the improvement effected using the product of this invention.

The power factor improvements of the present invention appear to be obtained not only with the 1-tolylene-2,4-diisocyanate but also with any type of polyisocyanate, including the following:

Polymethylene diisocyanates such as:
    Ethylene diisocyanate
    Trimethylene diisocyanate
    Tetramethylene diisocyanate
    Hexamethylene diisocyanate
Alkylene diisocyanates such as:
    Propylene-1,2-diisocyanate
    Butylene-1,2-diisocyanate
    Butylene-2,3-diisocyanate
Alkylidene diisocyanates such as:
    Ethylidene diisocyanate
    Butylidene diisocyanate
Alkyl triisocyanates such as: butane-1,2,2-triisocyanate
Cycloalkylene polyisocyanates such as:
    Cyclopentylene-1,3-diisocyanate
    Cyclohexylene-1,2-diisocyanate
    Cyclohexylene-1,2,3-triisocyanate
Aromatic polyisocyanates such as:
    m-Phenylene diisocyanate
    p-Phenylene diisocyanate
    1,2,4-benzene triisocyanate
    1-tolylene-3,5-diisocyanate
    Naphthalene-1,4-diisocyanate
    Diphenyl-4,4'-diisocyanate
    Methylene-bis(p-phenylene isocyanate)
Aralkyl polyisocyanates such as:
    Alk,alk'-1,4-xylylene diisocyanate
    Alk,ar-1,3-toluene diisocyanate
Heterocyclic polyisocyanates such as: pyridyl-2,3-diisocyanate
Ether-containing polyisocyanates such as: sym-dimethyl ether diisocyanate Although unbleached kraft pulp as described above appears to give the best results, other types of pulp such as bleached kraft and bleached or unbleached sulphite pulp and rag stock can also be reacted with a polyisocyanate to effect a corresponding power factor decrease. Furthermore, the polyisocyanate reaction produces approximately the same results whether effected on a crude pulp, the beaten pulp or the finished sheet. The power factor improvements shown at 60 cycles per second in Figure 2, are also obtainable at frequencies as high as 1000 cycles per second and higher.

The polyisocyanate treatment need not be carried out at the specific temperature given in the above example. In general, however, the use of lower reaction temperatures takes longer reaction times or higher polyisocyanate concentrations. Temperatures as low as 70° C. can be used very effectively, and lower temperatures are satisfactory if the treatment is prolonged over several days.

The upper temperature limit for the diisocyanate treatment appears to depend only upon the thermal stability of the materials. If desired, the treatment can be reduced in extent, a two-hour reaction at 70° C. producing a paper of lower power factor than heretofore available, particularly so with the higher concentrations of polyisocyanate. In general, polyisocyanate concentrations of from 1 to 100% are effective and the diluent used can be a hydrocarbon, ether or other material free of hydroxy and amino groups.

The form of capacitor in which the low power factor paper is used, is not limited to those described above. Thus it can be used in the so-called ultraminiature type of capacitor in which a convolutely wound single dielectric ribbon carries on its surface a pair of intermeshing toothed conductive coatings positioned so that a tooth portion on one turn of the winding is in capacitor relationship with an oppositely polarized tooth portion on the adjacent turn of the winding, as described in Edelberg application Serial No. 142,061, filed February 2, 1950, now abandoned. The so-called inductive or non-inductive types of the above terminal connections may be used in any of the above constructions.

As many apparently widely different embodiments of this invention may be made without departing from the spirit and scope hereof, it is to be understood that the invention is not limited to the specific embodiments hereof except as defined in the appended claims.

What is claimed is:

1. A capacitor having two spaced electrodes of opposite polarity and between said electrodes a capacitor dielectric of cellulose fibers that have been reacted with an organic polyisocyanate.

2. A capacitor having two spaced electrodes of opposite polarity and between said electrodes a capacitor dielectric of kraft paper that has been reacted with an organic polyisocyanate.

3. A capacitor having spaced electrodes of opposite polarity separated by dielectrics made of cellulose which has been reacted with an organic polyisocyanate.

References Cited in the file of this patent

UNITED STATES PATENTS

| | | |
|---|---|---|
| 1,631,750 | McIntosh | June 7, 1927 |
| 2,284,895 | Hanford et al. | June 2, 1942 |
| 2,303,364 | Schirm | Dec. 1, 1942 |
| 2,333,922 | Foster | Nov. 9, 1943 |
| 2,535,690 | Miller | Dec. 26, 1950 |
| 2,576,045 | Robinson | Nov. 20, 1951 |

OTHER REFERENCES

Collins: Paper Ind. & Paper World, June 1943, pp. 263–269.